United States Patent [19]

Oehler

[11] 4,128,761

[45] Dec. 5, 1978

[54] PHOTODETECTOR CIRCUIT FOR BALLISTIC VELOCITY MEASUREMENT

[76] Inventor: Kenneth L. Oehler, Box 840, 501 Noton St., Pflugerville, Tex. 78660

[21] Appl. No.: 840,254

[22] Filed: Oct. 7, 1977

[51] Int. Cl.² .......................................... G01D 21/04
[52] U.S. Cl. .................................. 250/222 R; 324/178
[58] Field of Search ........ 250/214 R, 214 A, 214 RC, 250/209, 221, 222, 214 P; 324/174, 178; 356/27, 28; 354/24

[56] References Cited

U.S. PATENT DOCUMENTS

| 3,727,069 | 4/1973 | Crittenden et al. | 250/222 R |
| 3,792,354 | 2/1974 | Slaght et al. | 324/178 |
| 3,907,429 | 9/1975 | Kuhn et al. | 356/28 |

Primary Examiner—David C. Nelms
Attorney, Agent, or Firm—Roylance, Abrams, Berdo & Farley

[57] ABSTRACT

Light perturbations sequentially produced by a projectile at spaced points are detected by photodetectors connected to a logarithmic diode circuit which is AC coupled to an amplifier time-shared by the detectors. Successive pulses from the amplifier are interpreted by logic circuits to start and stop an interval counter.

5 Claims, 3 Drawing Figures

PHOTODETECTOR CIRCUIT FOR BALLISTIC VELOCITY MEASUREMENT

This invention relates to electronic apparatus for detecting perturbations about a quiescent level and to a ballistic measuring apparatus incorporating the electronic apparatus.

BACKGROUND OF THE INVENTION

In the measurement of ballistic projectile velocity, it is common to use a pair of photodetectors spaced a known distance apart to signal to a timer that the projectile has passed each detector. The interval of time measured by the timer and the known distance are then used to compute an instrumental velocity. The photodetectors normally operate by having the receiving elements (typically photodiodes or phototransistors) placed so that they receive steady illumination from incandescent lamps or another steady light source such as the sky or other broad source of light. The receiving element, the light source and the expected projectile path are arranged so that the projectile passes between the light source and the receiving element. The passage of the projectile causes a momentary decrease in the light intensity received by each receiving element. The electrical response of each receiving element is amplified and processed to provide appropriate start and stop signals to the timer.

The photodetector assemblies are typically called "screens" in the ballistics field because they replace physical conducting grids or screens which were used in earlier devices to signal passage of a projectile. Screens utilizing incandescent light sources were typically called "Lumiline" screens because the lamp most commonly used was a Lumiline lamp manufactured by the General Electric Company and others. Screens utilizing ambient light from the sky viewed through an optical slit or other mask were commonly called "sky screens". At the present time, the screens represent the most critical part of a velocity measuring system. The present state of the art in counting and computation circuits required for the timing and time-to-velocity conversion are far ahead of the technology of the screens.

A typical problem encountered in the fabrication and operation of photodetector assemblies for ballistics use is that the illumination received by the receiving element is not constant because of varying voltage to the incandescent lamp or lamps, varying amounts of dust in the light transmission path between the light source and the receiving element, aging of the incandescent lamp, varying distances from the light source to the receiving element, and varying cloud and atmospheric conditions and sun angles in the case of sky screens. Additionally, there are problems with the receiving elements because the amount of signal current produced by a receiving element under quiescent light conditions is a function of very broad manufacturing tolerances on the receiving element itself, the alignment of the optical system, and any aging characteristics of the receiving element. Still further, extraneous light sources may reflect from the projectile and cause abnormal behavior. For example, a strong light from the side may reflect from the projectile and cause the receiving element to preceive an increase in light level instead of the anticipated decrease.

Various efforts have been made to overcome these problems. For example, regulated voltage is provided to lamps to provide a steady light output in the presence of fluctuating power line voltage. Automatic gain control amplifiers are used to sense the amount of illumination provided by the lamps and to adjust the gain of amplifiers to compensate for changes in illumination level. Another approach is to select receiving elements for appropriate sensitivity, or to provide manual gain controls which the user can adjust to establish initial conditions. These various efforts are only partial solutions and are relatively complex and expensive, particularly when used in conjunction with each other.

BRIEF DESCRIPTION OF THE INVENTION

Accordingly, it is an object of the present invention to provide a ballistic measuring apparatus which is responsive only to changes in light level from a quiescent state, substantially disregarding the magnitude or direction of the change.

A further object is to provide an electronic circuit which converts a linear signal from a photoresponsive receiving element to logarithmic form, AC coupling this logarithmic signal to an amplifier of essentially fixed gain, and detecting the signal perturbations on either side of the quiescent point by a threshold detector to actuate the timing apparatus.

Yet another object is to provide a ballistics measuring apparatus utilizing a circuit of this type wherein plural photodetectors share amplifier circuits, thereby reducing the number of components needed for the system and to improve its operation.

Briefly described, an apparatus in accordance with the invention for measuring a ballistic characteristic of a projectile traveling along a predetermined path includes first and second photoresponsive circuit means having photosensitive portions for producing electrical signals substantially linearly representative of the level of light incident upon said photosensitive portions over a predetermined range, means for supporting said photodetectors in fixed and known spaced relationship with said photosensitive portions exposed to ambient light along said predetermined path, log circuit means connected to said first and second photoresponsive circuit means for producing signals proportional to the logarithms of said electrical signals representative of light level, an amplifier having an input and an output, capacitive circuit means connected between said log circuit means and said input to said amplifier for coupling AC signal components of the signal produced by said log circuit means representative of perturbations caused by rapid changes in the light incident upon said photosensitive portions to said amplifier and for blocking DC components thereof, and means responsive to the output of said amplifier for counting the interval of time elapsed between successive signals representing said rapid changes.

In order that the manner in which the foregoing and other objects are attained in accordance with the invention can be understood in detail, a particularly advantageous embodiment thereof will be described with reference to the accompanying drawings, which form a part of this specification, and wherein.

Figure 1:
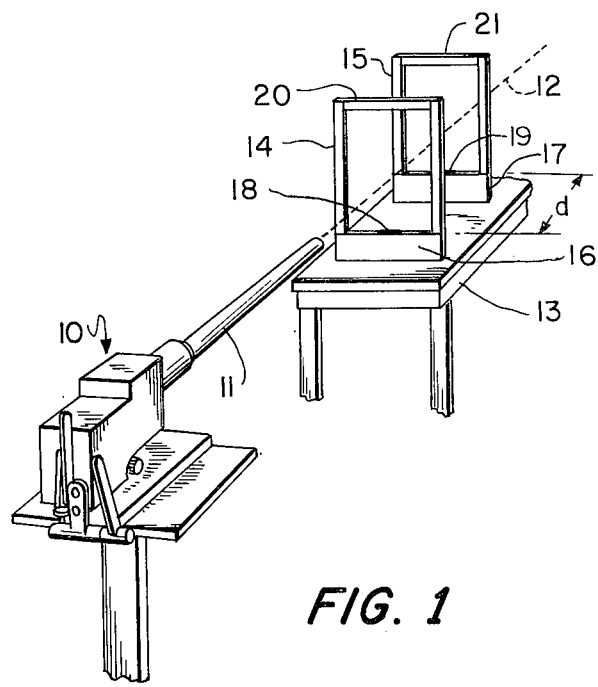
FIG. 1 is a schematic perspective view of a ballistic measuring apparatus of a type usable with the present invention.

FIG. 1 shows the general arrangement for a firearm and an apparatus for determining the velocity of a projectile emerging from that firearm. As shown in FIG. 1, a firearm is schematically illustrated at 10 with the barrel 11 thereof oriented so as to fire a projectile along an axis 12 through the measuring apparatus. This measuring apparatus includes a supporting device such as a table 13 which supports two frames 14 and 15 defining rectangular openings through which the projectile will pass. The frames are spaced apart in the direction of axis 12 a known and accurately determined distance $d$ as illustrated in FIG. 1, this distance being combinable with a measure of the time interval taken by the projectile in passing from one frame to the other to determine the projectile average velocity over that interval.

The frames includes bottom portions 16 and 17 with openings 18 and 19 facing upwardly to permit light to pass therethrough, the openings having photoresponsive devices exposed therein in such a way to receive the light entering these openings. This light can be simply the light from the sky, as previously indicated, or artificial sources of light can be disposed in the top portions 20 and 21 of the frames. The artificial light sources and photodetectors are connected to suitable circuitry, as will be described, by cables not shown in FIG. 1.

As previously mentioned, the aspect of particular interest in making a measurement using an apparatus such as that shown in FIG. 1 is the change in light falling on the photocell caused by the passage of a projectile. This passage can involve a perturbation in the level of light impinging upon the photocell in the order of 1 to 10 percent, depending upon the quiescent light level, the size of the projectile, and other factors. The actual light level is not of particular interest so long as it is sufficient to permit detection of the change therein.

Figure 2:
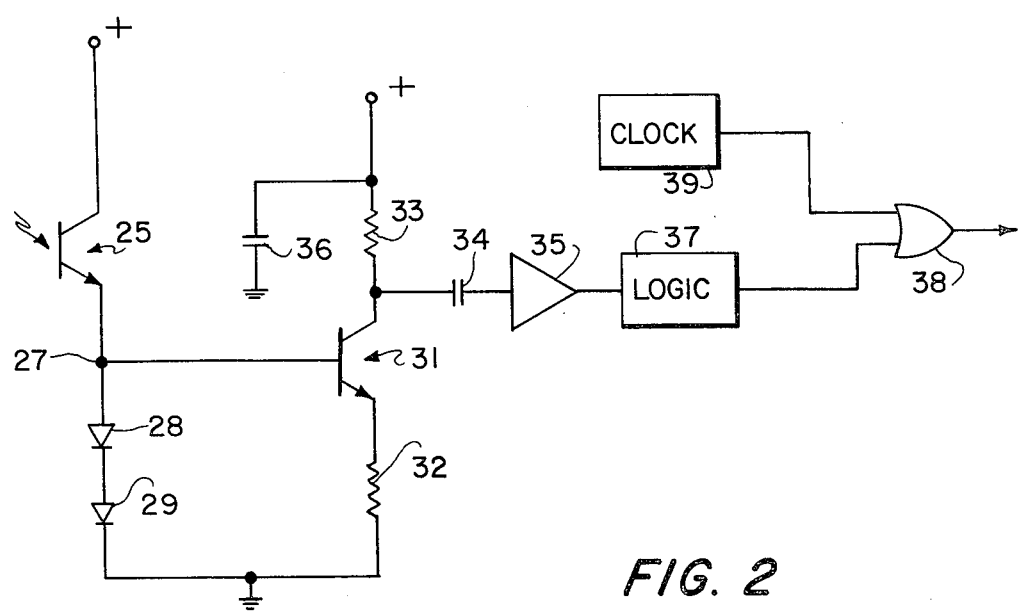
FIG. 2 is a schematic circuit diagram in simplified form of a circuit in accordance with the invention.

A simplified circuit in accordance with the invention which utilizes this characteristic is shown in FIG. 2. A single photodetector comprising a phototransistor indicated generally at 25 has a collector electrode connected to a positive voltage terminal and an emitter electrode connected to a junction 27. A pair of silicon diodes 28 and 29 are connected in series circuit relationship between junction 27 and ground, these diodes being of similar characteristics but not necessarily matched. Diodes such as type 1N914 can be used. A conventional PNP transistor indicated generally at 31 has its base electrode connected to junction 27 and its emitter electrode connected through a resistor 32 to ground. The collector electrode of transistor 31 is connected through a resistor 33 to the positive voltage source and through a coupling capacitor 34 to the input terminal of an amplifier 35. A bypass capacitor 36 is connected between the positive supply terminal and ground.

The output terminal of amplifier 35 can be connected, as shown, to a threshold crossing detector and logic circuit 37, the output of which controls a gate 38. A clock pulse generator 39 is connected to the other input of gate 38 so that when the logic circuit renders the gate conductive, clock pulses are delivered to a utilization device such as a counter.

The current generated by light incidence on the phototransistor 25 and passing through diodes 28 and 29 establishes a quiescent operating point for transistor 31, the use of two diodes in series being effective to provide, at junction 27, a sufficient output voltage such that junction 27 can be directly coupled to the base of transistor 31. Thus, the AC gain of circuit 31 is determined by the ratio of the collector resistor 33 to the emitter resistor 32. It will be recognized that the DC operating point of transistor 31 will change slightly with the current through the input diodes, but the amplifier remains biased in its linear range. The use of this arrangement permits some simplification of the circuit in that a coupling capacitor and additional bias resistors are not necessary in the first stage of amplification.

Transistor 31 thus operates as an amplifier circuit and provides, through coupling capacitor 34, a pulse signal to the input of amplifier circuit 35 whenever a rapid perturbation of the light supplied to transistor 25 occurs.

Of particular interest in the circuit of FIG. 2 is, first, that it does not respond to relatively slowly varying conditions such as changes in light level. Rather, the circuit responds to rapid changes and produces a pulse signal accurately representative of the time at which the rapid perturbation occurs. Second, the circuit produces the time signal ragardless of the direction of the change. Third, the incorporation of diodes 28 and 29 provides a logarithmic conversion of the signal. The percentage change of the quiescent level, which is typically a constant percentage over a wide range of light levels is, converted by this log circuit, into a substantially constant voltage change which is recognized by the amplifier circuit. The system is, in effect, looking at only the log of the quotient of perturbed illumination level divided by quiescent illumination level. Thus, the actual sensitivity of the photodetector element is of relatively little consequence.

Figure 3:
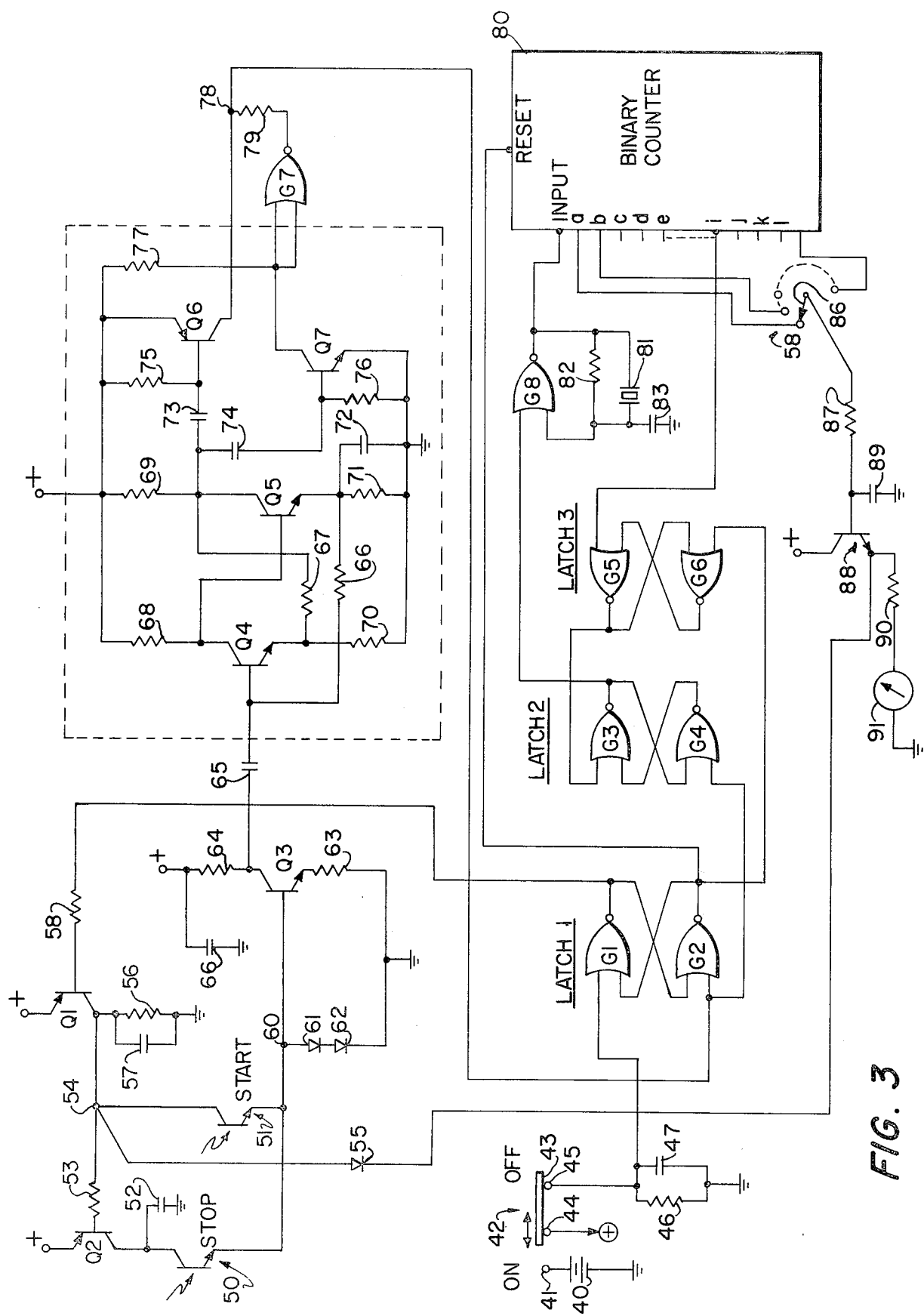
FIG. 3 is a schematic diagram, partly in block form, of the circuit portion of a complete ballistic measuring apparatus in accordance with the invention.

FIG. 3 shows a somewhat more complete schematic diagram of a circuit usable with the apparatus of FIG. 1. The power supply for the circuit is provided by a DC source such as a battery 40 which is connected between ground and a terminal 41 which forms part of a slide switch indicated generally at 42. Switch 42 is a make-before-break switch having a slidable movable contact 43 which, in the "off" position bridges contacts 44 and 45. As the sliding contact 43 is moved to the left and comes in contact with terminal 41, voltage is momentarily supplied to terminal 45 and to a parallel circuit including a resistor 46 and a capacitor 47 connected between terminal 45 and ground. The slide element is then moved further to the left in which position it continues to bridge terminals 41 and 44, terminal 44 being connected to the various positive terminals illustrated in the diagram to supply power to the various portions of the circuit and terminal 45 is disconnected. The purpose of the momentary supply of voltage to the parallel RC circuit is to provide a positive reset signal to the logic portion of the circuit, which will be described in detail hereafter. After that reset signal has been supplied, resistor 46 discharges capacitor 47.

Referring now to the upper portion of the circuit of FIG. 3, it will be seen that two phototransistors indicated generally at 50 and 51 are provided, these being the "stop" and "start" photodetectors, respectively, which can be mounted behind slots 19 and 18 in the apparatus of FIG. 1. The collector of phototransistor 50 is connected to the collector of a PNP transistor Q2, the emitter of which is connected to the positive voltage source. The collectors of these transistors are also connected to a bypass capacitor 52, the other terminal of which is connected to ground. The base electrode of transistor Q2 is connected through a resistor 53 to a junction 54. Also connected to junction 54 is the anode of a diode 55; the collector electrode of phototransistor 51; and the collector electrode of a PNP transistor Q1, the emitter of which is also connected to the DC source. A parallel circuit including a resistor 56 and a capacitor 57 is connected between the collector of Q1 and ground, and the base of transistor Q1 is connected through a resistor 58 to the output terminal of a gate G1 in the logic circuit, to be described.

The emitter electrodes of phototransistors 50 and 51 are connected to a junction 60 which is the functional equivalent of junction 27 in the circuit of FIG. 2. Conventional diodes 61 and 62 are connected in series circuit relationship between junction 60 and ground, and junction 60 is also connected to the base electrodes of an NPN transistor Q3, the emitter electrode of which is connected to a resistor 63 to ground. The collector electrode of Q3 is connected through a collector resistor 64 to the positive supply and to one terminal of a coupling capacitor 65. A bypass capacitor 66 is connected from the positive terminal to ground.

The other terminal of capacitor 65 is connected to the base electrode of an NPN transistor Q4 and, through a resistor 66 to the emitter electrode of an NPN transistor Q5. The collector electrode of transistor Q4 is connected to the base electrode of transistor Q5, and the collector electrode of Q5 is connected through a fixed resistor 67 to the emitter electrode of transistor Q4. The collector electrodes of transistor Q4 and Q5 are also connected through fixed resistors 68 and 69, respectively, to the positive source. Similarly, the emitter electrodes of transistors Q4 and Q5 are connected through fixed resistors 70 and 71 to ground. A bypass capacitor 72 is connected in parallel with resistor 71 between the emitter of Q5 and ground.

The collector electrode of transistor Q5 is connected through a coupling capacitor 73 to the base electrode of a PNP transistor Q6 and through a coupling capacitor 74 to the base electrode of an NPN transistor Q7. The base of Q6 is connected through a resistor 75 to the positive voltage source and the base of transistor Q7 is connected through a fixed resistor 76 to ground. The emitter electrode of transistor Q6 is connected to the positive source and the emitter of Q7 is connected to ground. The collector electrode of Q7 is connected to both input terminals of a NOR gate G7 and, through a fixed resistor 77 to the positive supply. The collector electrode of transistor Q6 is connected to a terminal 78 to which terminal the output of G7 is connected through a resistor 79.

Terminal 78 is connected to one input of a NOR gate G2 which is interconnected with NOR gate G1 to form a circuit identified as latch 1. In this interconnection, the output of each of gates G1 and G2 is connected to one input of the other one of those gates. In the case of latch 1, one input is a reset input from switch 42, as previously described. The other input is received from terminal 78, that input also being connected to one input of NOR gate G4 which is part of a circuit identified as latch 2, which circuit includes gates G3 and G4. These gates are similarly interconnected, as are gates G5 and G6 forming latch 3.

The G1 output of latch 1 is carried through resistor 58 to the base of Q1. The G2 output of latch 1 is connected to the reset input of a binary counter 80 and is also connected to one input of gate G6 in latch 3. The G3 output of latch 2 is connected to one input of a NOR gate G8 which is an oscillator gate circuit. The G5 output of latch 3 is connected to one input of G3 in latch 2, and one input of G5 in latch 3 is connected to one of the count outputs from binary counter 80.

NOR gate G8 is associated with a crystal-controlled RC oscillator circuit having a crystal oscillating element 81, a resistor 82 connected in parallel circuit relationship with the crystal, and a capacitor 83 which is connected between one end of this parallel circuit and ground, the point of connection of the capacitor also being the other input of NOR gate G8. The other terminal of the parallel circuit is connected to the output of G8 and to the "count" input of binary counter 80.

In the following table are given, by way of example, values for the resistors and capacitors in the circuit of FIG. 3.

| Resistors | Ohms |
|---|---|
| 46 | 1M |
| 53 | 22K |
| 56 | 2.2K |
| 58 | 22K |
| 63 | 470 |
| 64 | 3.9K |
| 66 | 39K |
| 67 | 39K |
| 68 | 10K |
| 69 | 3.9K |
| 70 | 220 |
| 71 | 1K |
| 75 | 39K |
| 76 | 39K |
| 77 | 39K |
| 79 | 10K |
| 82 | 1M |
| 87 | 22K |
| 90 | 1.2K |
| Capacitors | Mfd |
| 47 | .01 |
| 52 | .01 |
| 57 | .01 |
| 65 | .0018 |
| 72 | 1 |
| 73 | .01 |
| 74 | .01 |
| 83 | 20 pf |
| 89 | .01 |

The operation of the circuit thus far described is as follows. When switch 42 is moved from the off to the on position, the circuitry is energized and a "power on" reset signal is supplied to latch 1, as described. The reset signal sets the latch such that the output from G2 resets the binary counter 80 to zero and inhibits counting of an input signal. The signal from G2 also sets the G5 output of latch 3 "high" which, in turn, sets the G3 output of latch 2 low. When the G3 output is low, the oscillator including gate G8 is enabled at a crystal-controlled frequency of, for example, 0.4 MHz. The output of gate G1 turns on transistor Q1 (renders that transistor conductive) to effectively connect phototransistor 51 to the positive supply voltage. As will be recalled, phototransistor 51 is the "start" transistor which is to initiate the timing interval. When transistor Q1 is turned on, Q2, the base of which is connected to the collector of Q1, is turned off and phototransistor 50 is effectively disabled. Diodes 61 and 62 receive the current generated in phototransistor 51, which current, with its associated voltage, establishes the bias point of amplifier stage Q3. The negligible amount of current from the phototransistor is drawn by the base of Q3. Transistors Q4 and Q5 form a fixed gain stage connected to the output of the Q3 stage by coupling capacitor 65 and loading resistor 66. Transistors Q6 and Q7 constitute threshold detectors. Both transistors are normally held in a non-conductive condition by resistors 75 and 76 connected to their bases, but transistor Q6 will be turned on by negative excursions of the collector of Q5 if the excursions are greater than approximately 0.6 volts from the quiescent value, and transistor Q7 will become conductive in response to similar positive excursions. If either one of transistors Q6 or Q7 is turned on, a positive signal is provided at junction 78 and, therefore, to one input of gate G2. It will be observed that gate G7 is used in this connection as an inverter so that the negative output produced by Q7 will be received at junction 78 and by G2 as a positive input. This signal is recognized as a start signal and toggles the latch formed by gates G1 and G2 to remove the reset signal.

Thus, when latch 1 is toggled, counter 80 begins to count the pulses from the oscillator. Simultaneously, the change in output from gate G1 renders transistor Q1 non-conductive and transistor Q2 is rendered conductive to effectively disconnect phototransistor 51 and connect, or enable, phototransistor 50. Output G5 of latch 3 remains high until the binary counter reaches a predetermined count which, for example, can be a count of 256 which would occur 640 microseconds after the start signal is recognized at the oscillator frequency previously indicated. When that count is reached, an output is provided from G5 to G3 of latch 2 which leaves latch 2 in an enabled state. During this interval, shorter than the time required for the projectile to travel from the start screen to the stop screen, a new quiescent point of the amplifier section from diodes 61 and 62 through Q6 and Q7 is established. Not only must switching transients be allowed to damp out, but a different receiving element (phototransistor 50) and light source are now connected as input devices, and this will dictate a new quiescent point. The next signal indicating a rapid light perturbation will be interpreted by latch 2 as a "stop" signal and will toggle latch 2. When that latch toggles, the resulting high signal from the output of G3 stops the oscillator and the time counted up to that point will be stored in counter 80. This time will then be indicative of the time interval elapsed between the passage of a projectile between phototransistors 51 and 50 or, stated differently, between the detection of light perturbations by those two phototransistors.

The output of the binary counter can be coupled by conventional buffer devices and the like to a display, if desired. However, a relatively simple meter and switch circuit is disclosed herein for this purpose. As will be recognized, counter 80 has outputs which are identified by the letters a through l, the output i being connected as the input to latch 3, previously described. The readout circuit includes a selector switch having a plurality of fixed contacts equal in number to the count outputs of counter 80, and each one of the count outputs is connected to one of the fixed contacts of the selector switch. Switch 85 also has a movable wiper 86 which can be sequentially moved from contact to contact to sample the outputs at each of these terminals. Movable contact 86 is connected through a series circuit resistor 87 to the base electrode of an NPN transistor indicated generally at 88, a capacitor 89 being connected between the base electrode thereof and ground. The collector of transistor 88 is connected to the positive supply and the emitter is connected, through a fixed resistor 90, to one terminal of a meter 91, the other terminal of which is connected to ground. The emitter of transistor 88 is also connected to the cathode of diode 55.

In order to determine the final count in counter 80, one simply switches the movable wiper of switch 86 to each position, noting those at which the reading of meter 91 is high. This is the binary output of the counter which can then be converted to time and velocity by simple calculation or by reference to a conversion table. Transistor 88 and the associated elements are included in the circuit to provide isolation and amplification of the counter output. The connection of diode 51 between junction 54 and transistor 88 is to provide an indication on the meter when the system is first energized so that the operator will be assured that the system is actually turned on. After the toggling of latch 1, deenergizing transistor Q1, this indication will drop.

After the entire measurement sequence described above has been accomplished, switch 42 is returned to its off state and then again moved to the on state, and the system is ready for a new measurement.

As has been indicated herein, the operating characteristics of the foregoing system can be made somewhat more convenient, although more expensive and complex, by adding such features as direct digital display of time, computation and display of velocity from the measured time, etc. However, these features do not directly form a part of the present invention, and are therefore not disclosed herein. The essential characteristics of the system described are the conversion of the linear signal from the receiving photodetecting elements to logarithmic form, the AC coupling of the logarithmic signal to an amplifier of essentially fixed gain, and the detection of signal perturbations on either side of the quiescent point by a threshold detector to signal a timer to either start or stop. The sharing of the amplifier circuits is unique and particularly advantageous because the perturbations from the stop receiver are not recognized until after an appropriate time delay following the receipt of a signal from the start receiver.

While certain advantageous embodiments have been chosen to illustrate the invention, it will be understood by those skilled in the art that various changes and modifications can be made therein without departing from the scope of the invention as defined in the appended claims.

What is claimed is:

1. An apparatus for measuring a ballistic characteristic of a projectile traveling along a predetermined path comprising
    first and second photoresponsive circuit means having photosensitive portions for producing electrical signals substantially linearly representative of the level of light incident upon said photosensitive portions over a predetermined range;
    log circuit means connected to said first and second photoresponsive circuit means for producing signals proportional to the logarithms of said electrical signals representative of light level;
    an amplifier having an input and an output;
    capacitive circuit means connected between said log circuit means and said input to said amplifier for coupling AC signal components of the signals produced by said log circuit means representative of perturbations caused by rapid changes in the light incident upon said photosensitive portion to said amplifier and for blocking DC components thereof; and
    means responsive to the output of said amplifier for measuring the interval of time elapsed between successive signals representing said rapid changes.

2. An apparatus according to claim 1 wherein said log circuit means includes at least one semiconductor diode connected in series circuit relationship with said photoresponsive circuit means.

3. An apparatus according to claim 2 wherein each of said photoresponsive circuit means includes
a source of voltage;
a phototransistor; and
a transistor switch connected to said phototransistor and to said source of voltage.

4. An apparatus according to claim 3 and further comprising
circuit means interconnecting said transistor switches in said first and second photoresponsive circuit means for energizing only one of said switches at any time whereby only one of said phototransistors is responsive to light level changes at any time; and wherein said means responsive to the output of said amplifier includes means for changing the states of said switches.

5. An apparatus for producing a pulse output representative of a perturbation in a light level comprising
photoresponsive circuit means having a photo sensitive portion for producing electrical signals substantially linearly representative of the level of light incident upon said photosensitive portions over a predetermined range;
log circuit means connected to said photo responsive circuit means for producing signals proportional to the logarithms of said electrical signals representative of light level;
an amplifier having an input and an output; and
capacitive circuit means connected between said log circuit means and said input to said amplifier for coupling only the AC signal components of the signals produced by said log circuit means to said amplifier and for blocking DC components thereof.

* * * * *